United States Patent
Petersen et al.

[15] 3,681,346
[45] Aug. 1, 1972

[54] α-ISOMER OF THE DECANOIC ACID ESTER OF 10-[3,-(4-HYDROXYETHYL-1-PIPERAZINYL)PROPYLIDENE]-2-TRIFLUORO-METHYL THIAXANTHENE, ACID ADDITION SALTS THEREOF, METHOD OF USE AND COMPOSITIONS

[72] Inventors: Povl Viggo Petersen, Virum; Thorkil Ammitzboll, Greve Strand, both of Denmark

[73] Assignee: Kefalas A/S, Copenhagen-Valby, Denmark

[22] Filed: June 20, 1969

[21] Appl. No.: 835,250

[52] U.S. Cl.............................260/240 TC, 424/250
[51] Int. Cl..............................................C07d 51/70
[58] Field of Search................................260/240 TC

[56] References Cited

UNITED STATES PATENTS 3,116,291  12/1963  Petersen et al. .............260/240
3,282,930  11/1966  Craig et al. ..................260/240
3,350,268  10/1967  Yale et al...................260/243 X

OTHER PUBLICATIONS

Winthrop et al., J. Org. Chem. Vol. 27, pages 230 to 231 (1962)

Primary Examiner—John D. Randolph
Attorney—Gordon W. Hueschen

[57] ABSTRACT

The present invention is concerned with the α-isomer of the decanoic acid ester of 10-[3-(4-hydroxyethyl-1-piperazinyl)propylidene]2-trifluoroemethyl thiaxanthene, the non-toxic acid addition salts thereof, methods of preparing the same, therapeutic compositions thereof having prolonged effect, and a method of treating psychotic patients therewith.

7 Claims, No Drawings

α-ISOMER OF THE DECANOIC ACID ESTER OF 10-[3,-(4-HYDROXYETHYL-1-PIPERAZINYL)PROPYLIDENE]-2-TRIFLUORO-METHYL THIAXANTHENE ACID ADDITION SALTS THEREOF, METHOD OF USE AND COMPOSITIONS

The α-isomer of the decanoic acid ester of 10-[3-(4-hydroxyethyl-1-piperazinyl)propylidene]-2-trifluoromethyl thiaxanthene the non-toxic acid addition salts thereof, methods for the preparation of the said compound, therapeutic compositions thereof having prolonged effect, and a method of treating psychotic patients therewith.

The compound 10-[3-(4-hydroxyethyl-1-piperazinyl)propylidene]-2-trifluoromethyl thiaxanthene has in recent years, in the form of a mixture of the cis-trans isomers, proved outstanding as a neuroleptic drug in the treatment of psychotic disorders, mostly schizophrenic patients.

The compound, which in the following is called flupenthixol (pINN) for short, is effective in small doses and is preferably used in the form of acid addition salts such as the dihydrochloride in oral unit dosage forms. The daily dose normally is in the range of 1–3 mg three times a day. When patients are discharged from hospital on a maintenance dosis it has often been a problem to have the patients take the tablets, and the result has been a high degree of recurrences.

Many neuroleptic drugs cause parkinson symptoms in the patients and this side-effect is a serious drawback for several of the neuroleptic drugs, also same having prolonged effect.

It is an object of the present invention to avoid these drawbacks and provide a new composition with prolonged action, few side-effects, and a method of treating psychotic patients therewith.

The method for the preparation of 10-[3-(4-hydroxyethyl-1-piperazinyl)propylidene]-2-trifluoromethyl thiaxanthene found in the literature is described in U.S. Pat. No. 3,282,930 and leads only to an isomer having only negligible neuroleptic activity. This inactive isomer is in the following called the β-isomer. The neuroleptic drug flupenthixol is prepared according to the following scheme:

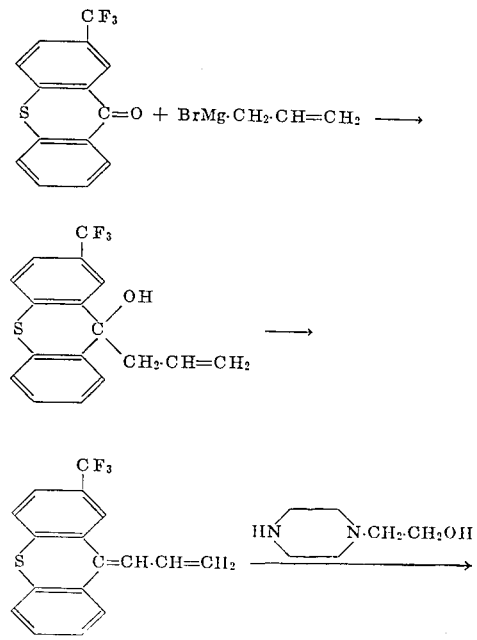

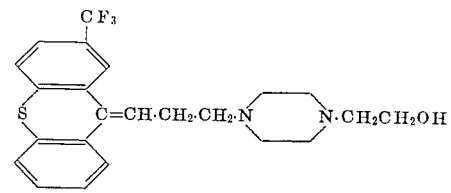

essentially as described in U.S. Pat. No. 3,116,291 for similar thiaxanthene derivatives.

The mixture of isomers thus obtained may then be separated by fractional crystallization, for example from diethylether whereby the α-isomer is obtained in excellent yield and practically free from the β-isomer.

The compound of the present invention is the α-isomer of the decanoic acid ester of flupenthixol, in the following called Lu 5-110 for short, which according to one method of the invention may be prepared by reacting the α-isomer of flupenthixol with a reactive derivate of decanoic acid, especially an acid halide such as the acid chloride.

It is a well known fact that the individual isomers of flupenthixol possess the desired pharmacological effects to different degrees. Thus the isomer which, as the free base, melts at 101°–102°C. (in the following called the α-isomer) shows by far the most pronounced neuroleptic activity, whereas the other isomer, which melts at 87°–94°C. (in the following called the β-isomer) has much less pronounced neuroleptic activity. A mixture of the isomers of flupenthixol, which is mostly obtained when synthesizing the compound, may be separated in the individual isomers, for example by fractional crystallization from ether.

When preparing the individual isomers according to the invention it is preferred to separate the isomers of flupenthixol before the esterification process, as it is more difficult to separate the isomers after the esterification.

According to one method of the invention the α-isomer of flupenthixol is esterified by reaction with a reactive derivative of decanoic acid preferably an acid halide such as the acid chloride in an inert solvent such as acetone, whereupon the decanoate is isolated in the form of the free base or in the form of a non-toxic acid addition salt, and if the decanoate is obtained as a mixture of isomers the α-isomer is isolated by fractional crystallization.

The non-toxic acid addition salts are preferably salts of pharmaceutically acceptable acids such as mineral acids, for example hydrochloric acid, hydrobromic acid, phosphoric acid, sulphuric acid, and the like, and organic acids such as acetic acid, oxalic acid, tataric acid, maleic acid, citric acid, methane sulphuric acid, and the like.

The following examples illustrate the method of the invention:

EXAMPLE 1

The decanoic acid ester of the isomer of 10-[3-(4-hydroxyethyl-1-piperazinyl)propylidene]-2-trifluoromethyl thiaxanthene which melts at 101°–102 °C., in the following called Lu 5-110 for short.

217 grams (0.5 mole) of the α-isomer of 10-[3-(4-hydroxyethyl-1-piperazinyl)propylidene]-2-trifluoromethyl thiaxanthene were dissolved in 500 milliliters of dry acetone and 140 grams (0.74 mole) of the acid chloride of decanoic acid were added. The mixture was refluxed for 30 minutes, cooled, and a solution of dry hydrogen chloride in ether added to a pH of 2–3, whereupon 200 milliliters of dry ether were added. The crystals which separated out were filtered off, washed with ether, and then treated with aqueous ammonia. The oil which separated out was extracted with ether, the ether phase washed with water, dried over anhydrous magnesium sulphate and evaporated on a steam bath finally at reduced pressure 0.05 mmHg. The yield was 270 grams of the base which was obtained as an oil, which is soluble in organic solvents such as acetone, ether or petroleum ether but insoluble in water.

When Lu 5-110 was dissolved in acetone and a solution of dry hydrogen chloride in ether added there was obtained a mixture of the mono- and dihydrochloride which melts at 115°–160°C. The solubility of the hydrochloride in water is about 12 milligrams in 100 milliliters of water.

The oxalate of Lu 5-110 was prepared by adding the equivalent amount of a solution of oxalic acid in acetone to a solution of Lu 5-110 in acetone. The crystalline oxalate was recrystallized from ethanol and melts at 219°–220°C. It is only slightly soluble in acetone, ether and water.

The maleate of Lu 5-110 was prepared in the same way and melts at 176°–178°C.

EXAMPLE 2

The hydrochloride of Lu 5-110 prepared from a mixture of isomers of flupenthixol.

25 grams of a mixture of isomers of flupenthixol (about equal parts of the cis- and trans isomer) were dissolved in 60 milliliters of dry acetone and 16.5 grams of the acid chloride of decanoic acid were added, whereupon the mixture was refluxed for 30 minutes. After cooling a solution of dry hydrogen chloride in ether was added to pH3. The crystalline precipitate (20 grams) which consisted mainly of the inactive β-isomer melted at 211°–214°C. To the mother liquor was added dry ether, and the crystals, which precipitated out and was filtered off, consisted mainly of the hydrochlorides of the α-isomer and melted at 130°–160°C. Thin layer chromatography showed that the fraction melting at 130°–160°C still contained some of the β-isomer, and it proved very difficult to remove this impurity even by repeated reprecipitations.

The invention further provides pharmaceutical compositions with prolonged action comprising, as active ingredient, the α-isomer of the decanoic acid ester of 10-[3-(4-hydroxyethyl-1-piperazinyl)propylidene]-2-trifluoromethyl thiaxanthene or one of its non-toxic acid addition salts together with a pharmaceutical carrier or excipient.

They may be administered to animals including human beings both orally, parenterally and rectally and may take the form of e.g. sterile solutions or suspensions for injection, tablets, suppositories, capsules, and syrups. Results upon administration to human beings of the compositions of the invention have been very gratifying.

Preferably, however, the compositions are in the form of sterile solutions or suspensions for injection, and in a preferred embodiment of the invention injectable solutions may be prepared from a non-toxic injectable fat or oil, e.g. light vegetable oil, sesam oil, olive oil, arachis oil or ethyl oleate, and they may additionally contain gelling agents, e.g. aluminum stearate, to delay absorption within the body. Such oily solutions have a very prolonged activity when rejected intramuscularly, and satisfactory neuroleptic action has been produced by a single intramuscular injection of about 20–40 mg of Lu 5-110 dissolved in a light vegetable oil for as long as 2–4 weeks.

The following examples illustrate the injectable oily solutions according to the present invention:

| | |
|---|---|
| 1. Lu 5-110 | 20 grams |
| sterile, light vegetable oil | ad 1000 ml |
| 2. Lu 5-110 | 30 grams |
| sterile sesam oil | ad 1000 ml |
| 3. Lu 5-110 | 40 grams |
| Aluminum mono stearate | 20 grams |
| sterile, light vegetable oil | ad 1000 ml |
| 4. Lu 5-110 | 20 grams |
| sterile olive oil | ad 1000 ml |

The solutions are filled in for example ampoules each containing 1 ml solution.

The active ingredient may also be administered in the form of a suspension of micronized Lu 5-110 or a salt thereof in sterile physiologically saline.

A suitable formula for a tablet containing 2 mg of Lu 5-110 is as follows:

| | |
|---|---|
| Lu 5-110 | 4mg |
| potato starch | 36 mg |
| lactose | 18 mg |
| gelatine | 4 mg |
| talcum | 6 mg |
| magnesium stearate | 0.4 mg |

Any other pharmaceutical adjuvants may be used provided that they are compatible with the active ingredient, and additional compositions and dosage forms may be similar to those presently used for neuroleptics. Also combinations of Lu 5-110 as well as its pharmacologically acceptable non-toxic acid addition salts with other active ingredients especially other neuroleptics, thymoleptics or the like, fall within the scope of the present invention.

In order to evaluate the degree of prolongation of effect obtained with Lu 5-110 dissolved in light vegetable oil, animal experiments were undertaken in mice, rats and dogs to compare the duration of action with that of flupenthixol base in light vegetable oil and flupenthixol, 2 HCl in aqueous solution.

As pharmacological criteria for "neuroleptic" action were chosen:

1. inhibition of conditioned avoidance response in mice,
2. inhibition of apomorphine gnaw-compulsion in rats, and
3. elevation of the threshold for apomorphine induced vomiting in dogs.

All the tests included are well known in the pharmacological testing of neuroleptic drugs.

INHIBITION OF CONDITIONED AVOIDANCE RESPONSE IN MICE

Male NMRI mice were trained in a shuttle box to avoid an electric shock signated by a preceding conditioning stimulus (buzzer tone). Each trial consisted of a 5 second period ($T_1$) under which the conditioning sound stimulus (buzzer) was presented, immediately followed by a 5 second period ($T_2$) under which the conditioning stimulus and an electric shock through the grid floor (unconditioned stimulus) were presented simultaneously. Each testblock consisted of 10 such trials in immediate succession.

Change of side (= movement from one compartment of the shuttle box to the other) in period $T_1$ was designated conditioned avoidance response. Change of side in period $T_2$ was designated unconditioned escape response. Inhibition of unconditioned escape is defined as failure to react in both $T_1$ and $T_2$. Each experimental group consisted of four to six mice, which were trained to a high degree of avoidance performance (>90 percent). Test substances were injected intramuscularly in the posterior thigh. Injection volume was 0.005 ml/10 g body weight.

When 0.06 mg kg / flupenthixol α-isomer, 2 HCl in aqueous solution were injected a maximal inhibition was seen in 3 hours and the effect disappeared completely between the 24 and 42 h test. A second injection about 56 hours after the first injection produced similar results. The maximal inhibition of avoidance was after the first injection about 65 percent and after the second injection about 75 percent while the maximal inhibition of escape was about 5 percent and 15 percent respectively.

Lu 5-110 5 mg/kg i.m. produced maximal inhibition at the 6 h test and the effect lasted 5–7 days. The maximal inhibition avoidance was about 95 percent and the inhibition was still about 20 percent 5 days after injection. 10 mg/kg also show maximal effect in 6 hours (avoidance about 100 percent) and the effect lasted for over 11 days.

APOMORPHINE ANTAGONISM TEST IN RATS

Neuroleptic drugs are powerful antagonists of apomorphine-induced compulsory gnawing (Jansen et al., Arzneimittel-Forschung, 17, 841, 1967). The method for measuring this type of antagonistic activity was as follows:

Male Wistar rats (250–300 g) were pretreated with Lu 5-110 (8 or 16 mg/kg s.c.) or flupenthixol base (8 mg/kg s.c.) 24 or 48 hours before testing. After a s.c. (subcutaneous) dose of 10 mg/kg of apomorphine hydrochloride the animals were isolated in individual cages for 1 hour. A cage consists of a 30 cm high box without bottom and lid. During the experiments the cages were placed on corrugated paper. The effect was compared to a non-pretreated control group. Absence of biting the paper in 30 percent or more of the animals was interpreted as a drug effect.

Two groups, each consisting of 10 rats, were used at each dose level. The two groups were tested on alternating days, group 1 starting 24 h and group 2 starting 48 h after injection. The solutions for injection were 2 percent solutions of the bases in light vegetable oil.

A comparative experiment was carried out with flupenthixol, 2HCl (2 or 8 mg/kg s.c.) in aqueous solution. These animals were tested 6, 17 and 24 hours after the administration of flupenthixol, 2 HCl.

The test showed that the effect of 8 mg/kg of Lu 5-110 lasted for four days, while that of 8 mg/kg of flupenthixol base lasted for only 2 days. The duration of the effect of flupenthixol, 2 HCl (8 mg/kg s.c.) in aqueous solution was 24 hours. Sedation was not observed in the rats treated with 8 mg/kg of Lu 5-110, whereas 16 mg/kg caused a moderate sedation lasting for 48 hours. All the animals treated with flupenthixol (base in oil or dihydrochloride in water) were heavily sedated.

INHIBITION OF APOMORPHINE INDUCED VOMITING IN DOGS

Adult purebred Beagle-dogs of either sex were used. The threshold dose of apomorphine for the provoking of vomiting in these dogs had been determined to 25 μg/kg i.v. After this vomiting occurs in a few minutes following the injection.

Four dogs were used for each dose level of the drug, which was injected subcutaneously at the back of the neck. At different times after the drug administration the dogs were then challenged with apomorphine according to an "up and down" schedule using the dose-range 25–400 μg/kg i.v. geometrically spaced. Thus, if for example a dog vomited after 100 μg/kg the next dog was given 50 μg/kg, or 200 μg/kg if the first dog did not vomit, and so on. In this way it was possible to estimate at which level of apomorphine the dogs were protected at a given time. The dogs were fed half an hour before testing to secure an easy vomiting-act.

It appeared that flupenthixol, 2 HCl in aqueous solution in a dose of 0.1 mg/kg yielded maximum protection 8 hours after the administration, whereas all dogs vomited at the threshold-dose after 16 hours. After 4 hours there was protection against 100 μg/kg and after half an hour there was no protection. Thus, the duration was in the range between one-half and 16 hours. The animals did not show any signs of sedation by this medication.

The duration of apomorphine protection after a single injection of Lu 5-110 in light vegetable oil (2 percent) was considerably prolonged.

Roughly, following 2 mg/kg of this composition the duration of protection was 1 week, after 4 mg/kg 2 weeks, and after 6 mg/kg almost 3 weeks. It appeared that the effect of 4 mg/kg and 6 mg/kg was identical except that after the latter dose an "after effect" for about 4 days was established.

We claim

1. A compound selected from the group consisting of (a) the α-isomer of the decanoic acid ester of 10- [3-(4 hydroxyethyl-1-piperazinyl) propylidene]-2-trifluoromethyl thiaxanthene and (b) non-toxic acid addition salts thereof.

2. A compound of claim 1 which is
The α-isomer of the decanoic acid ester of 10-[3-(4-hydroxyethyl-1-piperazinyl) propylidene]-2-trifluoromethyl thiaxanthene.

3. A compound of claim 1 which is
A non-toxic acid addition salt of the α-isomer of the decanoic acid ester of 10-[3-(4-hydroxyethyl-1-piperazinyl) propylidene]-2-trifluoromethyl thiaxanthene.

4. A compound of claim 1 which is
The hydrochloride of the α-isomer of the decanoid acid ester of 10-[3-(4-hydroxyethyl-1-piperazinyl)propylidene]-2-trifluoromethyl thiaxanthene.

5. A compound of claim 1 which is
The dihydrochloride of the α-isomer of the decanoic acid ester of 10-[3-(4-hydroxyethyl-1-piperazinyl)propylidene]-2-trifluoromethyl thiaxanthene.

6. A compound of claim 1 which is

The oxalate of the α-isomer of the decanoic acid ester of 10-[3-(4-hydroxyethyl-1-piperazinyl)propylidene]-2-trifluoromethyl thiaxanthene.

7. A compound of claim 1 which is

The maleate of the α-isomer of the decanoic acid ester of 10-[3-(4-hydroxyethyl-1-piperazinyl)propylidene]-2-trifluoromethyl thiaxanethene.

* * * * *